United States Patent
Schmitt et al.

(10) Patent No.: US 12,421,909 B2
(45) Date of Patent: Sep. 23, 2025

(54) SYSTEM AND METHOD FOR IMPROVING TURBOCHARGED ENGINE DRIVER TORQUE RESPONSE

(71) Applicant: GM Global Technology Operations LLC, Detroit, MI (US)

(72) Inventors: David Alexander Schmitt, Waterford, MI (US); Wesley Rieves Haney, Linden, MI (US); John Garrity Singleton, Detroit, MI (US); Robert Monchamp, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/448,492

(22) Filed: Aug. 11, 2023

(65) Prior Publication Data

US 2025/0052207 A1 Feb. 13, 2025

(51) Int. Cl.
 *F02D 41/00* (2006.01)
 *F02B 37/18* (2006.01)

(52) U.S. Cl.
 CPC ........ *F02D 41/0007* (2013.01); *F02B 37/183* (2013.01); *F02D 2200/101* (2013.01); *F02D 2200/501* (2013.01); *F02D 2200/602* (2013.01)

(58) Field of Classification Search
 CPC ........ F02B 37/16; F02B 37/18; F02B 37/183; F02D 41/0007; F02D 2200/101; F02D 2200/501; F02D 2200/602
 See application file for complete search history.

(56) References Cited

U.S. PATENT DOCUMENTS

| | | | |
|---|---|---|---|
| 10,590,836 B2 * | 3/2020 | McConville | F02B 37/16 |
| 10,895,197 B2 * | 1/2021 | Buckland | F02B 37/10 |
| 2010/0250042 A1 * | 9/2010 | Shamoto | B60W 10/08 |
| | | | 701/22 |

FOREIGN PATENT DOCUMENTS

| | | |
|---|---|---|
| DE | 102018216003 A1 | 4/2019 |
| DE | 102021132087 A1 | 6/2022 |
| DE | 102022102093 A1 | 8/2022 |

* cited by examiner

*Primary Examiner* — Gonzalo Laguarda
(74) *Attorney, Agent, or Firm* — Honigman LLP; Matthew H. Szalach; Jonathan P. O'Brien

(57) ABSTRACT

A computer-implemented method that, when executed by data processing hardware of a motor vehicle including a turbocharger having a turbine, causes the data processing hardware to perform operations. One operation includes receiving an accelerator pedal position input indicating that a vehicle accelerator pedal has moved to an overrun position. Another operation includes receiving one or more vehicle performance parameter inputs each corresponding to a measured vehicle performance parameter. Yet another operation includes calculating a vehicle dynamic score based on the one or more vehicle performance parameter inputs. A further operation includes determining a target boost profile based on the calculated vehicle dynamic score. Another operation includes instructing one or more outputs of the vehicle to transition to a dynamic mode to generate an increased turbine power based on the target boost profile.

15 Claims, 9 Drawing Sheets

SYSTEM AND METHOD FOR IMPROVING TURBOCHARGED ENGINE DRIVER TORQUE RESPONSE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for improving turbocharged engine driver torque response.

A forced induction system such as a turbocharger or supercharger can boost power output of an internal combustion engine without significantly adding weight. By increasing the charge air density in the individual cylinders of the engine, additional fuel can be added and a higher combustion pressure is achieved. Often, engines equipped with fuel injection systems utilize feedback from oxygen sensors in the exhaust to determine the appropriate air-to-fuel ratio. As such, when an engine is configured with a turbocharger, the fuel injection system increases the fuel flow to the cylinder relative to the increased air flow from the turbocharger.

The turbocharger converts exhaust flow energy to mechanical energy via a turbine. The turbine drives an intake air compressor via a shaft. The intake air compressor compresses air and provides the pressurized air (i.e., boost) to the engine cylinders to increase engine power output. The turbine is rotationally coupled to the compressor and is positioned in the exhaust stream, whereby the turbine is driven by the exhaust stream and ultimately drives the compressor to provide boost. Accordingly, the turbocharger may experience a lag in providing boost associated with the period of time that it takes for the turbine speed to increase based on the exhaust stream. Existing methods for mitigating turbocharger lag are reactive, and only attempt to improve turbocharger response after receiving an increased dynamic driver torque request (i.e., after the accelerator pedal is depressed). One main contributing factor for slow response in existing turbocharger systems is the time required for turbocharger airflow actuators to transition from a low power or overrun (i.e., accelerator pedal is lifted and fuel flow to the engine is stopped) configuration to a boost-generating configuration.

SUMMARY

An aspect of the disclosure provides a computer-implemented method that, when executed by data processing hardware of a motor vehicle including a turbocharger having a turbine, causes the data processing hardware to perform operations. One operation includes receiving an accelerator pedal position input indicating that a vehicle accelerator pedal has moved to an overrun position. Another operation includes receiving one or more vehicle performance parameter inputs each corresponding to a measured vehicle performance parameter. Yet another operation includes calculating a vehicle dynamic score based on the one or more vehicle performance parameter inputs. A further operation includes determining a target boost profile based on the calculated vehicle dynamic score. Another operation includes instructing one or more outputs of the vehicle to transition to a dynamic mode to generate an increased turbine power based on the target boost profile.

This aspect of the disclosure may include one or more of the following optional features. In some examples, the operations further includes determining that the vehicle is in a dynamic state when the calculated vehicle dynamic score exceeds a threshold vehicle dynamic score, and when the vehicle is in the dynamic state, instructing the one or more outputs of the vehicle to transition to the dynamic mode to generate the increased turbine power.

In some examples, the one or more vehicle performance parameter inputs includes at least one of a vehicle acceleration input or an accelerator pedal position. In some implementations, determining that the vehicle is in a dynamic state includes determining that the vehicle is the dynamic state while the accelerator pedal is in the overrun position. In some configurations, the one or more outputs of the vehicle include an air intake rate, a fuel intake rate, a wastegate actuator output, and a camshaft phaser output.

In some implementations, the operation of instructing one or more outputs of the vehicle to transition to a dynamic mode occurs while the accelerator pedal is in the overrun position. In some examples, the one or more vehicle performance parameter inputs include accelerator pedal position, accelerator pedal position rate of change, and accelerator pedal position accumulation. In some configurations the one or more vehicle performance parameter inputs includes brake pedal position, braking force, vehicle lateral force, vehicle longitudinal force, driver selected vehicle mode, engine speed, vehicle speed, and transmission gear selection.

Another aspect of the disclosure provides a system including data processing hardware and memory hardware in communication with the data processing hardware. The memory hardware stores instructions that, when executed on the data processing hardware, cause the data processing hardware to perform operations. One operation includes receiving an accelerator pedal position input indicating that a vehicle accelerator pedal has moved to an overrun position. Another operation includes receiving one or more vehicle performance parameter inputs each corresponding to a measured vehicle performance parameter. Yet another operation includes calculating a vehicle dynamic score based on the one or more vehicle performance parameter inputs. A further operation includes determining a target boost profile based on the calculated vehicle dynamic score. Another operation includes instructing one or more outputs of the vehicle to transition to a dynamic mode to generate an increased turbine power based on the target boost profile.

This aspect of the disclosure may include one or more of the following optional features. In some examples, the operations further includes determining that the vehicle is in a dynamic state when the calculated vehicle dynamic score exceeds a threshold vehicle dynamic score, and when the vehicle is in the dynamic state, instructing the one or more outputs of the vehicle to transition to the dynamic mode to generate the increased turbine power.

In some examples, the one or more vehicle performance parameter inputs includes at least one of a vehicle acceleration input or an accelerator pedal position. In some implementations, determining that the vehicle is in a dynamic state includes determining that the vehicle is the dynamic state while the accelerator pedal is in the overrun position. In some configurations, the one or more outputs of the vehicle include an air intake rate, a fuel intake rate, a wastegate actuator output, and a camshaft phaser output.

In some implementations, the operation of instructing one or more outputs of the vehicle to transition to a dynamic mode occurs while the accelerator pedal is in the overrun position. In some examples, the one or more vehicle performance parameter inputs include accelerator pedal position, accelerator pedal position rate of change, and accelerator pedal position accumulation. In some configurations the one or more vehicle performance parameter inputs includes brake pedal position, braking force, vehicle lateral force, vehicle longitudinal force, driver selected vehicle mode, engine speed, vehicle speed, and transmission gear selection.

Another aspect of the disclosure provides a motor vehicle having a sensor system including a plurality of sensors, an actuator system including a plurality of actuators associated with a turbocharger, data processing hardware sensor system and the actuator system, and memory hardware in communication with the data processing hardware, the memory hardware storing instructions that when executed on the data processing hardware cause the data processing hardware to perform operations One operation includes receiving an accelerator pedal position input indicating that a vehicle accelerator pedal has moved to an overrun position. Another operation includes receiving one or more vehicle performance parameter inputs each corresponding to a measured vehicle performance parameter. Yet another operation includes calculating a vehicle dynamic score based on the one or more vehicle performance parameter inputs. A further operation includes determining a target boost profile based on the calculated vehicle dynamic score. Another operation includes instructing one or more outputs of the vehicle to transition to a dynamic mode to generate an increased turbine power based on the target boost profile.

This aspect of the disclosure may include one or more of the following optional features. In some examples, the operations further includes determining that the vehicle is in a dynamic state when the calculated vehicle dynamic score exceeds a threshold vehicle dynamic score, and when the vehicle is in the dynamic state, instructing the one or more outputs of the vehicle to transition to the dynamic mode to generate the increased turbine power.

In some examples, the one or more vehicle performance parameter inputs includes at least one of a vehicle acceleration input or an accelerator pedal position. In some implementations, determining that the vehicle is in a dynamic state includes determining that the vehicle is the dynamic state while the accelerator pedal is in the overrun position. In some configurations, the one or more outputs of the vehicle include an air intake rate, a fuel intake rate, a wastegate actuator output, and a camshaft phaser output.

In some implementations, the operation of instructing one or more outputs of the vehicle to transition to a dynamic mode occurs while the accelerator pedal is in the overrun position. In some examples, the one or more vehicle performance parameter inputs include accelerator pedal position, accelerator pedal position rate of change, and accelerator pedal position accumulation. In some configurations the one or more vehicle performance parameter inputs includes brake pedal position, braking force, vehicle lateral force, vehicle longitudinal force, driver selected vehicle mode, engine speed, vehicle speed, and transmission gear selection.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
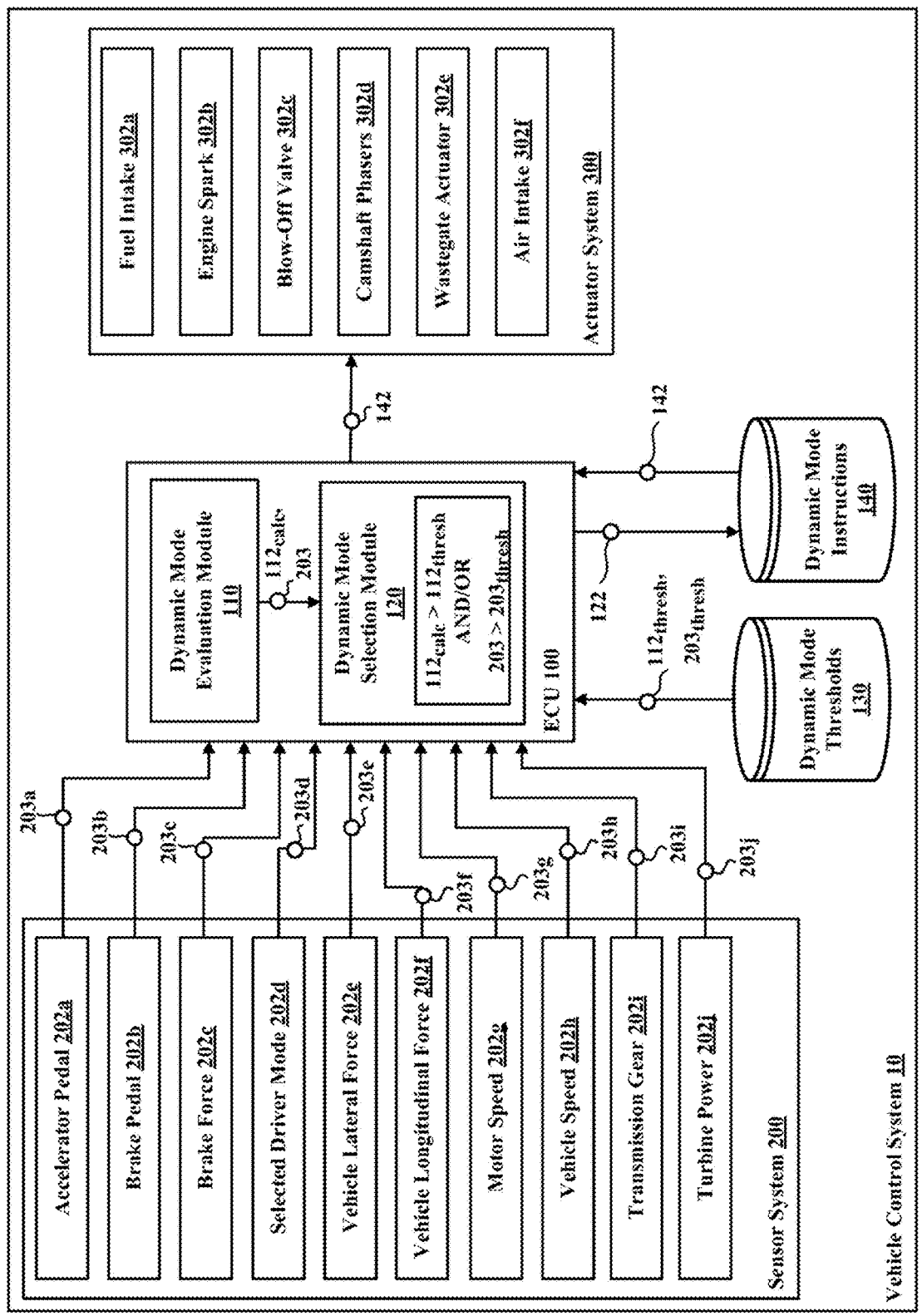
FIG. 1 is a schematic diagram of an example of a vehicle control system for a turbocharged internal combustion engine of a motor vehicle according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The present disclosure relates to a system and method for improving torque response in performance driving scenarios of a turbocharged vehicle without sacrificing efficiency in comfort or tour driving scenarios. The present disclosure accomplishes this improvement by anticipating when the driver will require optimum torque response to perform dynamic maneuvers and then adjusting actuators associated with the turbocharger to achieve a target turbine power based on vehicle and driving dynamics. The system of the present disclosure preemptively stages the turbocharger actuators during overrun for optimum torque response, minimizing the lag typically associated with actuator reconfiguration. The system also determines an increased anticipated boost target based on a tip-in torque response associated with the accelerator pedal position. This boost target is then used to calculate a target turbine power and to determine the target actuator configuration to achieve the desired turbine enthalpy at the current exhaust temperature.

When the driver tips out of the accelerator pedal (i.e., releases the accelerator pedal), the system determines if certain performance thresholds are satisfied for operating the vehicle either in a normal mode (i.e., steady state), a static mode (i.e., pre-staging turbocharger system actuators) or a dynamic mode (i.e., active staging turbocharger system actuators). If system determines the vehicle is in dynamic mode, the current exhaust manifold temperature is evaluated to determine whether to instruct the actuator system of the vehicle to transition into an overrun fuel cut configuration or to provide fuel to increase or maintain exhaust temperature for turbine enthalpy. This function prevents excessive cooling of the exhaust manifold during high load operation to keep the catalysts at the optimum temperature for emissions control.

During a tip-in period in dynamic mode, a torque efficiency of the engine is requested to satisfy the driver torque request while maintain the target turbine enthalpy for best torque response at exit of the tip-in period (e.g., vehicle acceleration). Each configuration in dynamic mode uses a different level of torque efficiency to best represent the target torque response requested by the driver.

Referring to FIG. 1, a schematic representation of a vehicle control system 10 according to an example of the disclosure is provided. The vehicle control system 10 includes an engine control unit (ECU) 100 having a controller 102 (e.g., data processing hardware) and memory hardware 104. The engine control unit 100 communicates with a sensor system 200 including one or more vehicle sensors 202, 202a-202i and a turbocharger actuator system 300 including one or more vehicle actuators 302, 302a-302f. The vehicle control system 10 is not limited to the components shown, and may include additional or less components without departing from the scope of the present disclosure. The components may communicate via wireless or wired connections and may be distributed across multiple locations of the vehicle. In some configurations, the vehicle control system 10 interfaces with a remote computing device and/or a user. For instance, vehicle control system 10 may include various components for communicating with the vehicle control system 10, such as a joystick, buttons, wired communication ports, and/or wireless communication ports for receiving inputs from and providing feedback to the remote computing device and/or user.

In the illustrated example, the sensor system 200 includes a plurality of sensors 202, 202a-202i each configured to measure or estimate a vehicle performance parameter, which is then provided to the engine control unit 100 as a vehicle performance parameter input 203, 203a-203i for evaluating and selecting a corresponding staging mode for the actuator system 300, such as a static mode SM or a dynamic mode DM. As shown, the engine control unit 100 includes a dynamic mode evaluation module 110 configured to receive the vehicle performance parameter inputs 203, 203a-203i from the sensor system 200 and to calculate a vehicle dynamic score 112 based on the one or more vehicle performance parameter inputs 203, 203a-203i. The dynamic mode evaluation module 110 transmits the calculated vehicle dynamic score $112_{calc}$ to the dynamic mode selection module 120, which determines that the vehicle is in a dynamic operating state (i.e., the vehicle being operated in a relatively aggressive state) and generates corresponding target boost profile 122. In some examples, the dynamic mode selection module 120 evaluates the calculated vehicle dynamic score $112_{calc}$ relative to a threshold dynamic score $112_{thresh}$ and determines that the vehicle is in a dynamic operating state when the calculated vehicle dynamic score $112_{calc}$ exceeds a threshold dynamic score $112_{thresh}$. In other examples, the dynamic mode selection module 120 evaluates the calculated vehicle dynamic score $112_{calc}$ relative to a dynamic score scale $112_{scal}$ (e.g., 0 to 100) and generates a corresponding target boost profile 122.

As discussed throughout the disclosure, the vehicle control system 10 is configured to evaluate the vehicle performance inputs 203 received from the sensors 202 and to reconfigure the actuators 302 in a corresponding staging mode. For example, depending on calculated vehicle dynamic score $112_{calc}$, the dynamic mode selection module 120 may instruct the actuator system 300 to operate in any one of a normal mode NM, a static mode SM, or a dynamic mode DM. Generally, normal mode NM refers to operating the actuator system 302 in a steady-state condition directly responsive to an input received from the driver, such as depressing the accelerator pedal. Thus, in normal mode NM, the engine control unit 100 configures the actuator system 200 based on the current driver power or torque request. Static mode SM refers to an initial passive staging mode, whereby the engine control unit 100 instructs the actuator system 300 to configure in anticipation of a future power request from the driver while maintaining the turbine power output corresponding to the current torque request from the driver. Dynamic mode DM refers to an active staging mode, whereby the engine control unit 100 instructs the actuator system 300 to configure in anticipation of a future power request from the drive while also increasing the turbine power output corresponding to an anticipated power request. Thus, the engine control unit 100 anticipatorily reconfigures the actuator system 300 in both static mode SM and dynamic mode DM, but further instructs the actuator system 300 to actively increase boost during dynamic mode.

Referring still to FIG. 1, the sensor system 200 includes an accelerator pedal position sensor 202a configured to measure a position of an accelerator pedal of the vehicle and to provide a corresponding accelerator pedal position input 203a to the engine control unit 100. In operation, the dynamic mode evaluation module 110 obtains the accelerator pedal position input 203a and uses the accelerator pedal position input 203a to determine (i) a current accelerator pedal position APP of the accelerator pedal at a given instance in time (e.g., zero pedal, full pedal) and (ii) a rate of change dAPP/dt of the accelerator pedal position APP during a given period of time. Thus, as discussed below, both of the accelerator pedal position APP and the rate of change dAPP/dt may be evaluated by the dynamic mode evaluation module 110 to determine whether the vehicle is operating in a dynamic state. Additionally, the current accelerator pedal position APP may be evaluated by the engine control unit 100 to determine when to instruct the actuator system 300 to transition to a dynamic mode DM.

The sensor system 200 may further include a brake pedal position sensor 202b configured to measure a position of a brake pedal of the vehicle and to provide a corresponding brake pedal position input 203b to the engine control unit 100. In operation, the dynamic mode evaluation module 110 obtains the brake pedal position input 203b and uses the brake pedal position input 203b to determine (i) a current brake pedal position BPP of the brake pedal at a given instance in time (e.g., zero pedal, full pedal) and (ii) a rate of change dBPP/dt of the brake pedal position during a given period of time. Thus, both brake pedal position BPP and the rate of change dBPP/dt may be evaluated by the engine control unit 100 to determine when to instruct the actuator system 300 to transition to a dynamic mode DM.

The sensor system 200 may further include a brake force sensor 202c configured to measure or determine an actual braking force associated with application of the brake pedal. Thus, in addition to measuring the brake pedal position BPP using the brake pedal position sensor 202b, the sensor system 200 may also measure or determine the actual force applied by a braking system of the vehicle, which is then provided to the engine control unit 100 as a brake force input 203c. The brake force input 203c may correspond to an aggregate braking force applied by the braking system at all of the vehicle wheels. In some examples, the brake force input 203c may include independent brake force inputs 203c each representing the measured brake force at a respective one of the vehicle wheels.

The sensor system 200 may further include a selected driver mode sensor 202d configured to indicate a selected driver mode (e.g., weather mode, tour mode, sport mode, track mode) for the vehicle, which is provided to the engine control unit 100 as a selected driver mode input 203d. While the selected driver mode sensor 202d is schematically represented as being a part of the sensor system 200, it should be appreciated that the engine control unit 100 may obtain or determine the selected driver mode input 203d directly based on an input from a vehicle user interface (e.g., gear selector input).

As discussed below, the dynamic mode evaluation module 110 considers the selected driver mode input 203d in calculating the vehicle dynamic score 112. For example, where the selected driver mode input 203d indicates that the vehicle is in a relatively aggressive driver mode (e.g. sport mode, track mode), the dynamic mode evaluation module 110 may weight or bias the calculated vehicle dynamic score 112 to increase the calculated vehicle dynamic score 112. Thus, the calculated vehicle dynamic score may be increased or multiplied by a driver mode input factor when the vehicle is in a more aggressive driver mode such that the dynamic mode evaluation module 110 calculates a higher vehicle dynamic score 112 than if the vehicle is in a less aggressive driver mode and all other vehicle performance parameters are the same. Conversely, where the selected driver mode input 203d indicates that the vehicle is in a less aggressive mode (e.g., weather mode, tour mode), the dynamic mode evaluation module 110 may weight or bias the calculated vehicle dynamic score 112 to decrease the calculated vehicle dynamic score 112.

Additionally or alternatively, the dynamic mode evaluation module 110 assign respective ranges or limits for the vehicle dynamic score 112 based on the selected driver mode input 203d. For example, in a vehicle having four driver modes (e.g., weather mode, tour mode, sport mode, track mode) and a vehicle dynamic score scale ranging from 0 to 100, the dynamic mode evaluation module 110 may limit the vehicle dynamic score 112 to values ranging from 0 to 25 when the vehicle is in weather mode, 26-50 when the vehicle is in tour mode, 51-75 when the vehicle is in sport mode, and 76-100 when the vehicle is in track mode. Thus, when the vehicle is in track mode, the lowest vehicle dynamic score 112 calculated by the dynamic mode evaluation module 110 would by 76, regardless of the values of the vehicle performance parameters 203 received from the sensor system 200. It should be appreciated that the modes, scales, and ranges provided are an illustrative example, and that other nomenclature (e.g., normal mode, comfort mode) and values (e.g., 0 to 1000) may be selected.

With continued reference to FIG. 1, the sensor system 200 includes one or more vehicle lateral force sensors 202e for measuring lateral force associated with the vehicle, which is then provided to the engine control unit 100 as a vehicle lateral force input 203e. In use, the vehicle lateral force input 203e is evaluated by the dynamic mode evaluation module 110 in determining the calculated vehicle dynamic score $112_{calc}$. For example, when the vehicle is operating in a turning or sliding (i.e., drifting) maneuver, the magnitude of the lateral forces associated with such maneuver will be relatively high compared to steady state driving (i.e., straight-line driving) and the dynamic mode evaluation module 110 will increase the calculated vehicle dynamic score $112_{calc}$ accordingly. In other words, the calculated vehicle dynamic score $112_{calc}$ is more likely to exceed the threshold vehicle dynamic score $112_{thresh}$ (i.e., be in a dynamic mode DM) when the vehicle lateral forces are greater.

Similarly, the sensor system 200 includes one or more vehicle longitudinal force sensors 202f for measuring longitudinal force associated with the vehicle, which is then provided to the engine control unit 100 as a vehicle longitudinal force input 203f. In use, the vehicle longitudinal force input 203f is evaluated by the dynamic mode evaluation module 110 in determining the calculated vehicle dynamic score $112_{calc}$. For example, when the vehicle is operating in an acceleration or braking maneuver, the magnitude of the longitudinal forces associated with such maneuver will be relatively high compared to steady state driving (i.e., not acceleration or braking) and the dynamic mode evaluation module 110 will increase the calculated vehicle dynamic score $112_{calc}$ accordingly. In other words, the calculated vehicle dynamic score $112_{calc}$ is more likely to exceed the threshold vehicle dynamic score $112_{thresh}$ (i.e., be in a dynamic mode DM) when the vehicle longitudinal forces are greater.

Referring still to FIG. 1, the sensor system 200 may include an engine speed sensor 202g configured to measure the speed (e.g., revolutions per minute) of the vehicle motor, which is then provided to the engine control unit 100 as a motor speed input 203g. In use, the vehicle motor speed input 203g is evaluated by the dynamic mode evaluation module 110 in determining the calculated vehicle dynamic score $112_{calc}$. For example, when the motor is operating at a relatively high speed, the dynamic mode evaluation module 110 will increase the calculated vehicle dynamic score $112_{calc}$ accordingly. In other words, the calculated vehicle dynamic score $112_{calc}$ is more likely to exceed the threshold vehicle dynamic score $112_{thresh}$ (i.e., be in a dynamic mode DM) when the vehicle motor is operating at a high speed.

The sensor system 200 may further include a vehicle speed sensor 202h configured to measure the speed (e.g., kilometers per hour) of the vehicle, which is then provided to the engine control unit 100 as a vehicle speed input 203h. The vehicle speed input 203h may be calculated based on local measurements of the vehicle (e.g., wheel speed, transmission speed) or may be obtained from external speed measurement systems, such as a global positioning system of the vehicle. In use, the vehicle speed input 203h is evaluated by the dynamic mode evaluation module 110 in determining the calculated vehicle dynamic score $112_{calc}$. For example, when the vehicle is moving at a relatively high speed, the dynamic mode evaluation module 110 will increase the calculated vehicle dynamic score $112_{calc}$ accordingly. In other words, the calculated vehicle dynamic score $112_{calc}$ is more likely to exceed the threshold vehicle dynamic score $112_{thresh}$ (i.e., be in a dynamic mode DM) when the vehicle is moving at a high speed.

The sensor system 200 may also include a transmission gear sensor 202i configured to measure, determine, or obtain the current gear of the vehicle transmission, which is then provided to the engine control unit 100 as a transmission gear input 203i. In use, the transmission gear input 203i is evaluated by the dynamic mode evaluation module 110 in determining the calculated vehicle dynamic score $112_{calc}$. For example, when the vehicle transmission is in a relatively low gear respective to the measured vehicle speed (i.e., the driver has downshifted outside of the normal gear range for the corresponding vehicle speed), the dynamic mode evaluation module 110 will increase the calculated vehicle dynamic score $112_{calc}$ accordingly. In other words, the calculated vehicle dynamic score $112_{calc}$ is more likely to exceed the threshold vehicle dynamic score $112_{thresh}$ (i.e., be in a dynamic mode DM) when the vehicle transmission is operating in a low gear relative to the vehicle speed.

As set forth above, the dynamic mode evaluation module 110 receives the inputs 203, 203a-203i from the sensor system 200 and determines or calculates the calculated vehicle dynamic score $112_{calc}$ based on the vehicle performance parameter inputs 203, 203a-203i. Generally, the dynamic mode evaluation module 110 is configured to generate a greater calculated vehicle dynamic score $112_{calc}$ when the vehicle is executing functions typically associated with a relatively aggressive or dynamic driving state. While the dynamic mode evaluation module 110 may receive and evaluate multiple inputs in determining the calculated vehicle dynamic score $112_{calc}$, any one of the vehicle performance parameter inputs 203, 203a-203i may be sufficient for the dynamic mode evaluation module 110 to determine a calculated vehicle dynamic score $112_{calc}$ that exceeds the threshold vehicle dynamic score $112_{thresh}$. Thus, the vehicle performance parameter inputs 203, 203a-203i may be evaluated by the dynamic mode evaluation module 110 in the aggregate or independently. When using an aggregate calculated vehicle dynamic score $112_{calc}$, the dynamic mode evaluation module 110 may translate each of the vehicle performance parameter inputs 203, 203a-203i to a standardized scoring value (e.g., RPM to dynamic score; Newtons to dynamic score) and then add or factor the translated scoring value into the calculated vehicle dynamic score $112_{calc}$. Additionally or alternatively, the dynamic mode evaluation module 110 may independently transmit the vehicle performance parameter inputs 203 to the dynamic mode selection module 120 for determining whether the vehicle actuator system 300 should transition to the dynamic mode DM.

Referring still to FIG. 1, the dynamic mode selection module 120 receives the calculated vehicle dynamic score $112_{calc}$ and/or the vehicle performance parameter inputs 203, 203a-203i and determines whether the vehicle is operating in a dynamic state. Initially, upon receipt of the calculated vehicle dynamic score $112_{calc}$ and/or the vehicle performance parameter inputs 203, 203a-203i, the dynamic mode selection module 120 obtains the corresponding threshold vehicle dynamic score $112_{thresh}$ and/or a threshold vehicle performance parameter input $203_{thresh}$ from a dynamic mode threshold storage 130. The dynamic mode selection module 120 then compares calculated vehicle dynamic score $112_{calc}$ and/or the inputs 203, 203a-203i against the threshold vehicle dynamic score $112_{thresh}$ and/or threshold input $203_{thresh}$ to determine whether the vehicle is in a dynamic state. When using the calculated vehicle dynamic score $112_{calc}$, the dynamic mode selection module 120 compares the calculated vehicle dynamic score $112_{calc}$ to the threshold vehicle dynamic score $112_{thresh}$ and determines that the vehicle is in a dynamic state when the calculated vehicle dynamic score $112_{calc}$ exceeds the threshold vehicle dynamic score $112_{thresh}$ ($112_{calc} > 112_{thresh}$). Similarly, when using the individual vehicle performance parameter inputs 203, the dynamic mode selection module 120 compares each of the vehicle performance parameter inputs 203 to the corresponding threshold input $203_{thresh}$ and determines that the vehicle is in a dynamic state when the value of any one of the vehicle performance parameter inputs 203 exceeds the corresponding value of the threshold input $203_{thresh}$ ($203 > 203_{thresh}$).

When the dynamic mode selection module 120 determines that the vehicle is operating in a dynamic state (i.e., ($112_{calc} > 112_{thresh}$ and/or $203 > 203_{thresh}$), the dynamic mode selection module 120 obtains corresponding dynamic mode instructions 142 from a dynamic mode instruction storage 140. The dynamic mode instruction storage 140 includes a plurality of different dynamic mode instructions 142 each corresponding to a target boost profile 122 for the actuator system 300. For example, based on a particular set of values associated with the inputs 203, the dynamic mode selection module 120 determines a target boost profile 122 to be provided by the vehicle turbocharger and performs a look-up function in the dynamic mode instruction storage 140 to identify dynamic mode instructions corresponding to the target boost profile 122. In other words, the dynamic mode selection module 120 selects dynamic mode instructions 142 most closely associated with the current values of the vehicle performance parameter inputs 203 used to determine the target boost profile 122. For example, the dynamic mode selection module 120 may generate a target boost profile 122 and select a first set of dynamic mode instructions 142 where the value of the vehicle lateral force input 202e is relatively high and the other vehicle performance parameter inputs 203 are negligible. Alternatively, the dynamic mode selection module 120 may generate a second target boost profile 122 and select a different set of dynamic mode instructions 142 where the value of the vehicle lateral force input 202e is relatively low and the values of one or more of the other vehicle performance parameter inputs 203 is relatively high.

Additionally or alternatively, the dynamic mode instruction storage 140 may include different sets of dynamic mode instructions 142 corresponding with the selected driver mode input 203d. For example, the dynamic mode instruction storage 140 may include a first set of dynamic mode instructions 142 corresponding to a first target boost profile 122 associated with a low-performance mode (e.g., comfort, tour) and a second set of dynamic mode instructions 142 corresponding to a second target boost profile 122 associated with a high-performance mode (e.g., sport, performance). Thus, all other vehicle performance parameter inputs 203 being equal, the dynamic mode selection module 120 will retrieve the first set of dynamic mode instructions 142 when the driver mode input 203d indicates that the vehicle is in a low-performance mode (e.g., comfort, normal), and will retrieve the second set of dynamic mode instructions 142 when selected driver mode input 203d indicates that the vehicle is in a high-performance mode (e.g., sport, performance).

The dynamic mode instructions 142 include instructions for controlling the actuators 302, 302a-302f to achieve the target boost profile 122. For example, the dynamic mode instructions 142 include instructions for controlling outputs associated with one or more of a fuel intake rate 302a, engine spark timing 302b, a turbo-blow off valve actuator 302c, camshaft phasers 302d, a wastegate actuator 302e, and an air intake valve 302f. Based on the dynamic mode instructions 142 selected by the dynamic mode selection module 120, one or more of the actuators 302 may be adjusted or staged to achieve the desired target boost 122.

Figure 2:
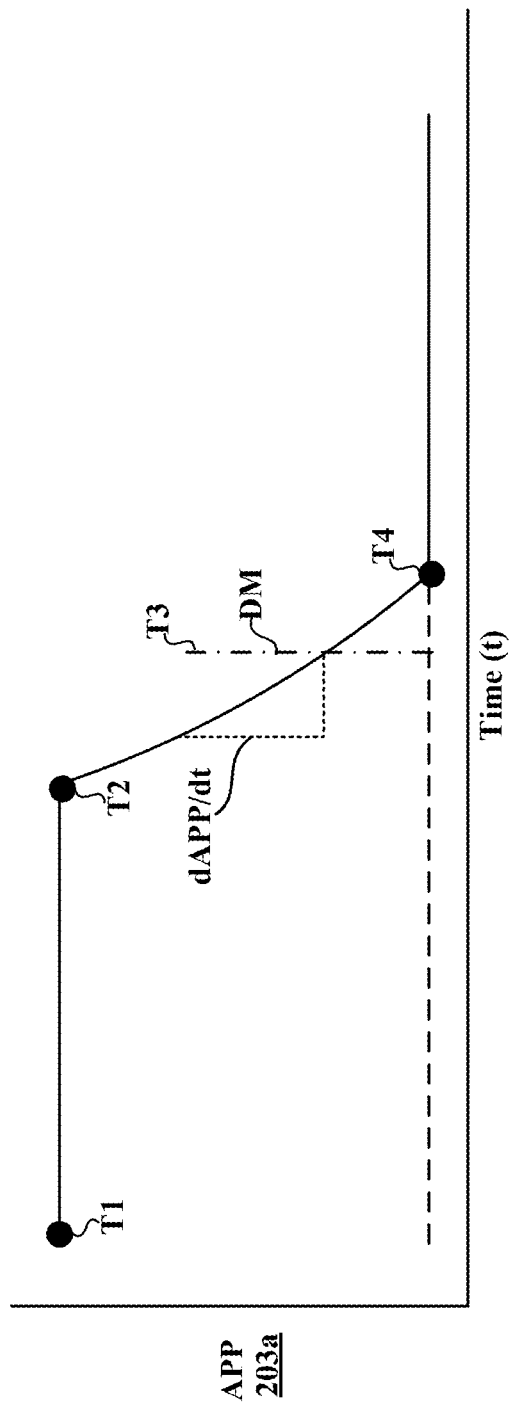
FIG. 2 is a graph showing an example operation of the vehicle control system of FIG. 1, wherein the vehicle control system determines the motor vehicle is operating in a dynamic mode based on an accelerator pedal position.

Referring to FIG. 2, a first example of the operation of the vehicle control system 10 to transition the actuator system 300 to dynamic mode DM is provided. In this example, the vehicle control system 10 transitions the actuator system 300 to dynamic mode DM based on a rate of change of the accelerator pedal position APP (i.e., change in accelerator pedal position over time dAPP/dt), which is determined by the dynamic mode evaluation module 110 based on the accelerator pedal position input 203a. At a first time T1, the accelerator pedal position APP is at a non-zero state (i.e., the accelerator pedal is depressed by the driver) during steady-state operation of the vehicle. At a second time T2, the driver removes pressure from the accelerator pedal and the accelerator pedal position APP transitions to the zero-pedal state, as indicated by the decreasing value of the accelerator pedal position input 203a represented by the segment extending between the second time T2 and the fourth time T4. As discussed previously, the dynamic mode evaluation module 110 receives the accelerator pedal position input 203a from the accelerator pedal position sensor 202a and uses a series of accelerator pedal position inputs 203a to determine the measured accelerator pedal position change rate $dAPP/dt_{meas}$. Where the measured accelerator pedal position change rate dApp/dt exceeds a threshold change rate $dAPP/dt_{thresh}$, the dynamic mode selection module 120 determines that that vehicle is in a dynamic state at a third time T3 during the transition from the non-zero accelerator pedal position (T2) to the zero accelerator pedal position (T4). As discussed previously, upon determining that the vehicle is in a dynamic state, the dynamic mode selection module 120 determines a target boost profile 122 associated with the inputs 203 and requests corresponding dynamic mode instructions 142 from the dynamic mode storage 140. The dynamic mode instructions 142 are then executed by the engine control unit 100 to stage the actuator system in a dynamic mode DM.

Figure 3:
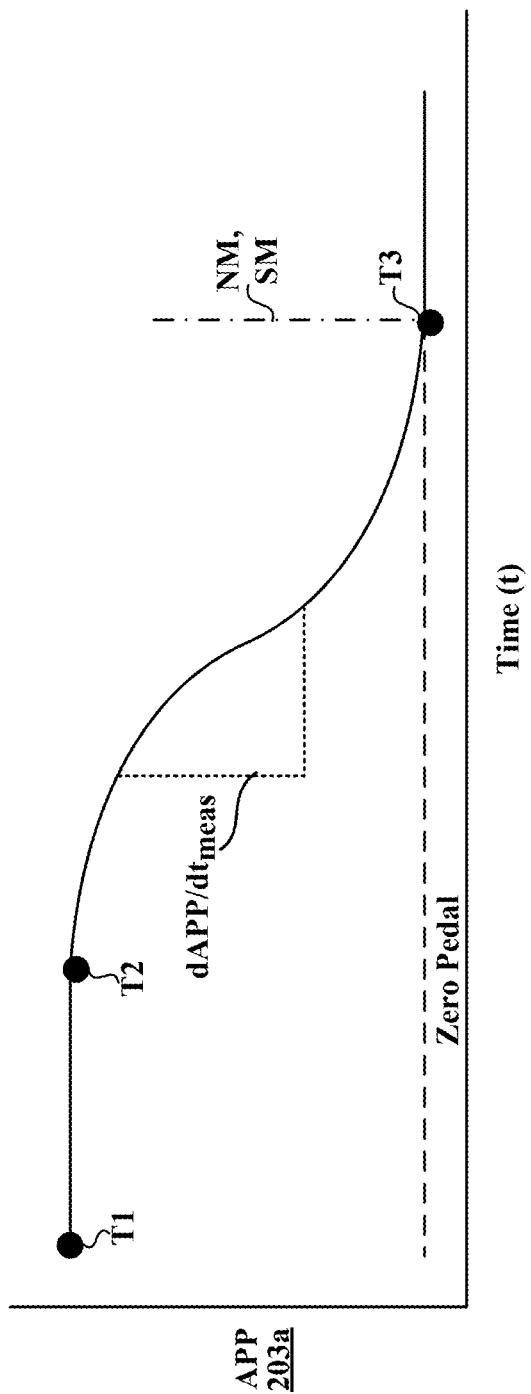
FIG. 3 is a graph showing an example operation of the vehicle control system of FIG. 1, wherein the vehicle control system determines the motor vehicle is operating in a static mode based on the accelerator pedal position.

Referring to FIG. 3, another example of the operation of the vehicle control system 10 is provided. In this example, the vehicle control system 10 does not transition the actuator system 300 to the dynamic mode DM based on the measured accelerator pedal position change rate $dAPP/dt_{meas}$. In other words, the vehicle control system 10 maintains the actuator system in normal mode NM or static mode SM based on the measured accelerator pedal position change rate $dAPP/dt_{meas}$. At a first time T1, the accelerator pedal position APP is at a non-zero state (i.e., the accelerator pedal is depressed by the driver) during steady-state operation of the vehicle. At a second time T2, the driver reduces pressure from the accelerator pedal and the accelerator pedal position APP transitions towards the zero-pedal state, as indicated by decreasing value of the accelerator pedal position input 203a represented by the arcuate segment extending between the second time T2 and the third time T3. In this example, the accelerator pedal position APP moves to the overrun position (e.g., zero pedal) at a more gradual rate compared to the example shown in FIG. 2, which corresponds to a driver gradually reducing the pressure applied to the accelerator pedal.

As discussed previously, the dynamic mode evaluation module 110 receives the accelerator pedal position input 203a from the accelerator pedal position sensor 202a and uses a series of subsequent accelerator pedal position inputs 203a corresponding to the accelerator pedal transition period (i.e., from T2 to T3) to determine the measured accelerator pedal position change rate $dAPP/dt_{meas}$. Where the measured accelerator pedal position change rate dApp/dt does not exceed the threshold change rate $dAPP/dt_{thresh}$, the dynamic mode selection module 120 determines that that vehicle is not in a dynamic state during the transition from the non-zero accelerator pedal position (T2) to the zero accelerator pedal position (T3), and maintains the actuator system 300 in the static mode SM when the accelerator pedal reaches the overrun position. Thus, as shown in the illustrated example, the value of the measured accelerator pedal position change rate $dAPP/dt_{meas}$ does not exceed the threshold change rate $dAPP/dt_{thresh}$ for transitioning the actuator system to the dynamic mode DM.

Figure 4:
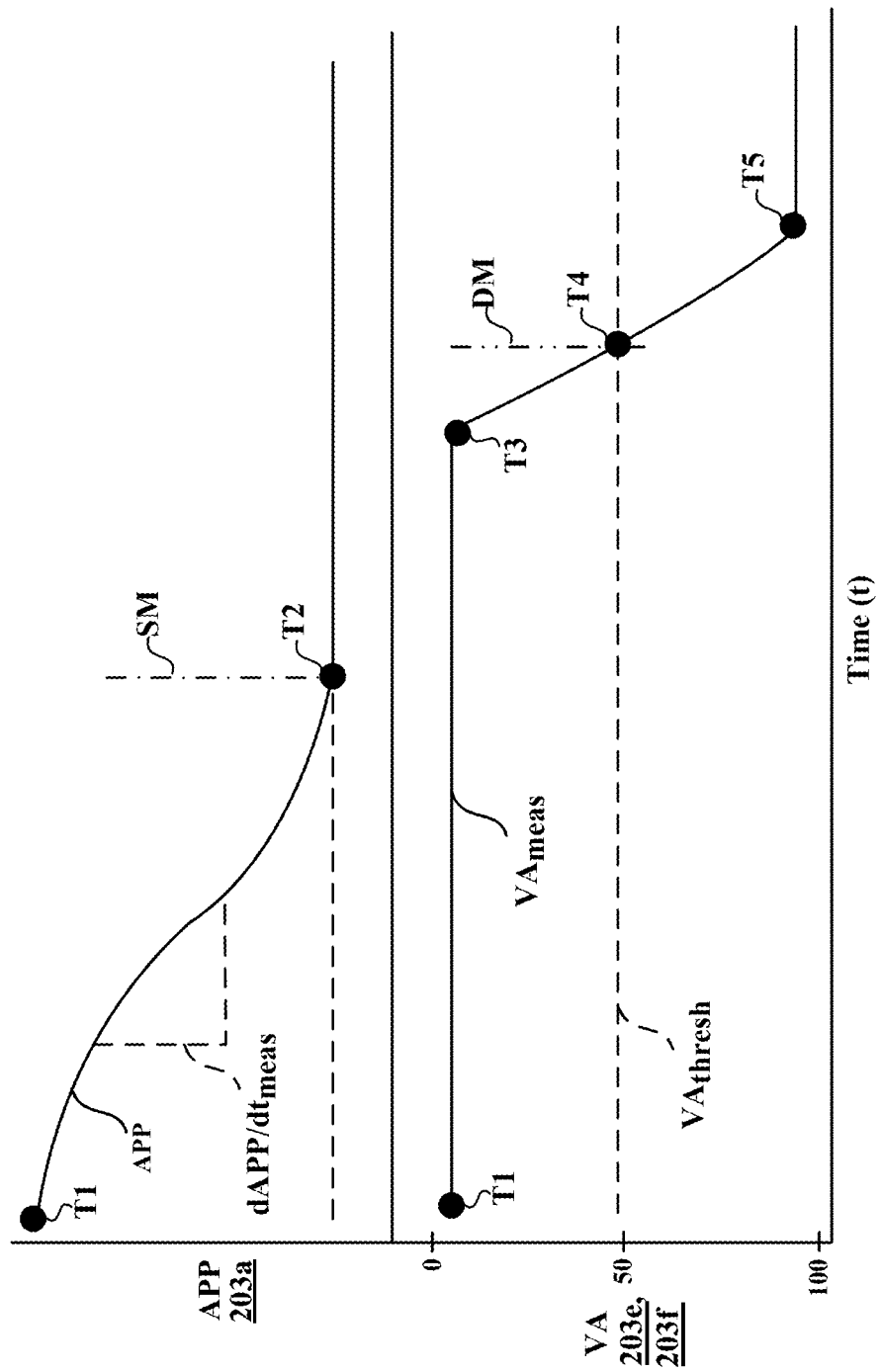
FIG. 4 is a graph showing an example operation of the vehicle control system of FIG. 1, wherein the vehicle control system determines the motor vehicle is operating in a dynamic mode based on accelerator pedal position and vehicle acceleration.

Referring to FIG. 4, another example of the operation of the vehicle control system 10 to transition the actuator system 300 from static mode SM to dynamic mode DM is provided. In this example, the vehicle control system 10 is shown as evaluating multiple vehicle performance parameter inputs 203 to determine whether to transition the actuator system 300 to the dynamic mode DM. In this example, the vehicle control system 10 initially determines that the vehicle is in static mode SM where the measured accelerator pedal position change rate $dAPP/dt_{meas}$ does not exceed the threshold change rate $dAPP/dt_{thresh}$, but then determines that the vehicle is in a dynamic mode DM based on a measured vehicle acceleration $VA_{meas}$. Particularly, at a first time T1, the accelerator pedal position APP is at a non-zero state (i.e., the accelerator pedal is depressed by the driver) during steady-state operation of the vehicle. From the first time T1 to the second time T2, the driver gradually decreases pressure on the accelerator pedal and the accelerator pedal position APP transitions to the zero-pedal state, as indicated by decreasing value of the accelerator pedal position input 203a represented by the segment extending between the first time T1 and the second time T2.

As discussed previously, the dynamic mode evaluation module 110 receives the accelerator pedal position input 203a from the accelerator pedal position sensor 202a and uses a series of accelerator pedal position inputs 203a corresponding to the accelerator pedal transition period (i.e., from T1 to T2) to determine the measured accelerator pedal position change rate $dAPP/dt_{meas}$. Where the measured accelerator pedal position rate $dAPP/dt$ does not exceed the threshold change rate $dAPP/dt_{thresh}$—the dynamic mode selection module 120 determines that that vehicle is not in a dynamic state during the transition from the non-zero accelerator pedal position (T1) to the zero accelerator pedal position (T2), and maintains the actuator system 300 in the static mode SM when the accelerator pedal reaches the zero pedal position. Thus, as shown in the illustrated example, the value of the measured accelerator pedal position change rate $dAPP/dt_{meas}$ does not exceed the threshold change rate $dAPP/dt_{thresh}$ for transitioning the actuator system to the dynamic mode DM.

Concurrent with the evaluation of the accelerator pedal position input 203a, the dynamic mode selection module 120 evaluates a measured vehicle acceleration $VA_{meas}$, which may be based on the lateral force input 203e and/or the longitudinal force input 203f. Referring to the bottom portion of the chart in FIG. 4, the measured vehicle acceleration $VA_{meas}$ is charted concurrently with the accelerator pedal position APP. During the period from the first time T1 to a third time T3, the measured vehicle acceleration $VA_{meas}$ is at a steady state and may be zero. From the third time T3 to a fifth time T5, the measured vehicle acceleration $VA_{meas}$ changes from the steady state to a second measured vehicle acceleration $VA_{meas}$ and intersects a threshold vehicle acceleration $VA_{thresh}$ at a fourth time T4. Thus, at the fourth time T4, the dynamic mode selection module 120 determines that the measured vehicle acceleration $VA_{meas}$ satisfies the threshold vehicle acceleration $VA_{thresh}$ and calculates a target boost profile 122. As discussed previously, upon determining that the vehicle is in a dynamic state, the dynamic mode selection module 120 determines a target boost profile 122 associated with the inputs 203 and requests corresponding dynamic mode instructions 142 from the dynamic mode storage 140. The dynamic mode instructions 142 are then executed by the engine control unit 100 to stage the actuator system 300 in a dynamic mode DM.

Figure 5:
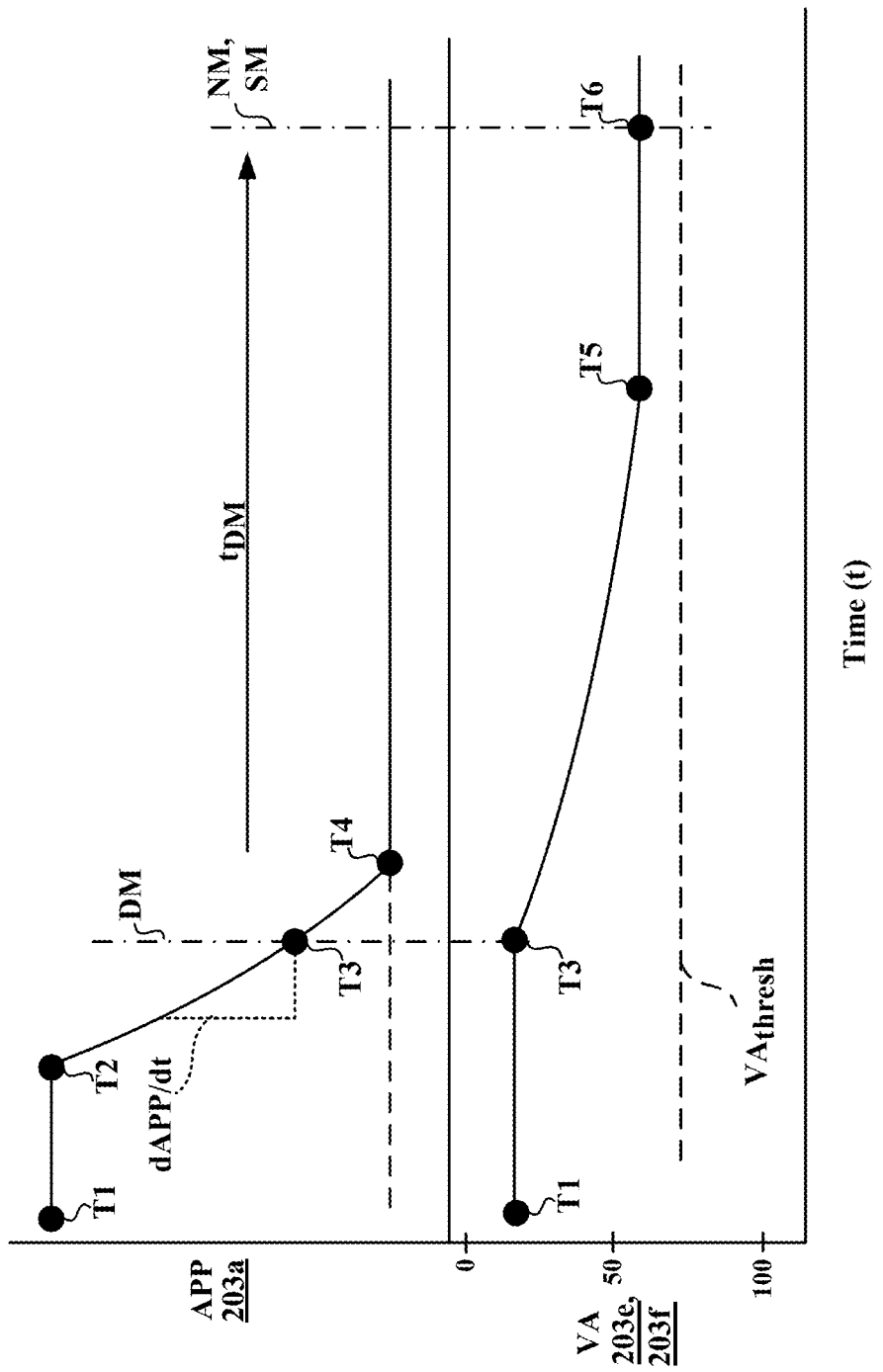
FIG. 5 is a graph showing an example operation of the vehicle control system of FIG. 1, wherein the vehicle control system determines the motor vehicle is operating in a static mode based on accelerator pedal position and vehicle acceleration.

Referring to FIG. 5, another example of the operation of the vehicle control system 10 to transition the actuator system 300 from dynamic mode DM to static mode SM is provided. In this example, the vehicle control system 10 is shown as evaluating multiple inputs 203 to determine whether to transition the actuator system 300 to the dynamic mode DM. In this example, the vehicle control system 10 initially determines that the vehicle is in dynamic mode DM where the measured accelerator pedal position change rate $dAPP/dt_{meas}$ exceeds the threshold change rate $dAPP/dt_{thresh}$, but then transitions the actuator system 300 to the static mode SM after no further vehicle performance parameter inputs 203 indicate that the vehicle is in the dynamic mode DM during a threshold time-out period $t_{DM}$. In other words, the dynamic mode DM associated with the accelerator pedal position change rate $dAPP/dt_{meas}$ times out after a period of time when the vehicle is not actually in a dynamic state.

At a first time T1, the accelerator pedal position APP is at a non-zero state (i.e., the accelerator pedal is depressed by the driver) during steady-state operation of the vehicle. At a second time T2, the driver removes pressure from the accelerator pedal and the accelerator pedal position APP transitions to the zero-pedal state, as indicated by decreasing value of the accelerator pedal position input 203a represented by the segment extending between the second time T2 and the fourth time T4. As discussed previously, the dynamic mode evaluation module 110 receives the accelerator pedal position input 203a from the accelerator pedal position sensor 202a and uses a series of accelerator pedal position inputs 203a to determine the measured accelerator pedal position change rate $dAPP/dt_{meas}$. Where the measured accelerator pedal position rate $dAPP/dt_{meas}$ exceeds a threshold change rate $dAPP/dt_{thresh}$, the dynamic mode selection module 120 determines that that vehicle is in a dynamic state at a third time T3 during the transition from the non-zero accelerator pedal position (T2) to the zero accelerator pedal position (T4). As discussed previously, upon determining that the vehicle is in a dynamic state, the dynamic mode selection module 120 determines a target boost profile 122 associated with the vehicle performance parameter inputs 203 and requests corresponding dynamic mode instructions 142 from the dynamic mode storage 140. The dynamic mode instructions 142 are then executed by the engine control unit 100 to stage the actuator system 300 in a dynamic mode DM.

Concurrent with the evaluation of the accelerator pedal position input 203a, the dynamic mode selection module 120 evaluates a measured vehicle acceleration $VA_{meas}$, which may be based on the lateral force input 203e and/or the longitudinal force input 203f. Referring to the bottom portion of the chart in FIG. 5, the measured vehicle acceleration $VA_{meas}$ is charted concurrently with the accelerator pedal position APP. During the period from the first time T1 to a third time T3, the measured vehicle acceleration $VA_{meas}$ is at a steady state and may be zero. From the third time T3 to a fifth time T5, the measured vehicle acceleration $VA_{meas}$ changes from the steady state to a second measured vehicle acceleration $VA_{meas}$. However, in this example, measured vehicle acceleration $VA_{meas}$ does not intersect a threshold vehicle acceleration $VA_{thresh}$ and remains above the threshold vehicle acceleration $VA_{thresh}$ through the sixth time T6. Thus, in this example, the dynamic mode selection module 120 determines that the measured vehicle acceleration $VA_{meas}$ never satisfies the threshold vehicle acceleration $VA_{thresh}$ within the dynamic mode time-out period $t_{DM}$ and instructs the actuator system 300 to return to the normal mode NM or static mode SM at the sixth time T6.

Figure 6:
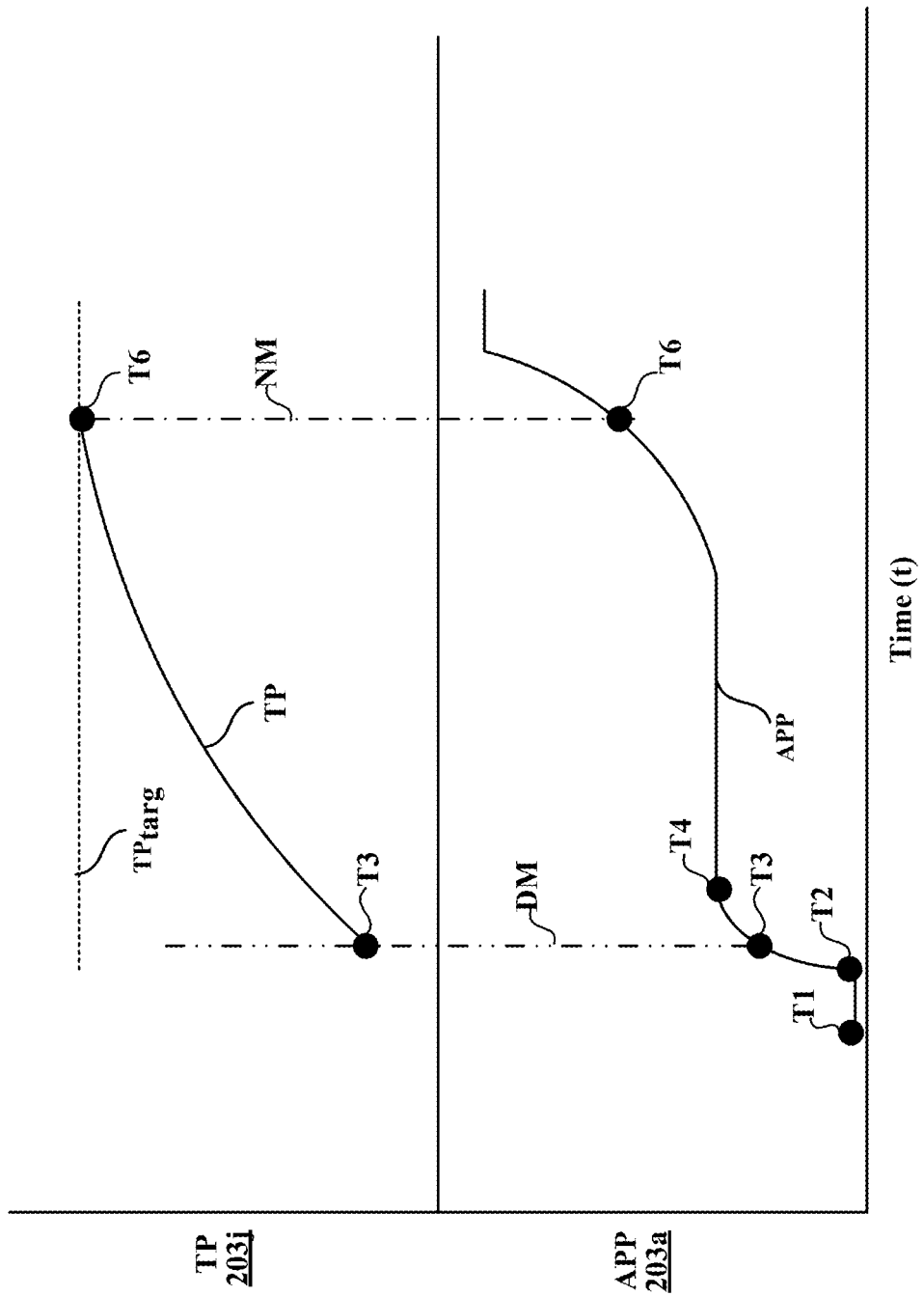
FIG. 6 is a graph showing an example operation of the vehicle control system of FIG. 1, wherein the vehicle control system generates increased turbine power during an accelerator pedal tip-in period.

Referring to FIG. 6, an example of the operation of the actuator system 300 during accelerator pedal tip-in (i.e., initial depression of the accelerator pedal during maneuver) is provided. Particularly, FIG. 6 represents how the actuator system 300 is staged and adjusted according to the dynamic mode instructions 142 to increase turbine power TP (i.e., boost) while the accelerator pedal position APP remains constant. Referring to the lower portion of the chart, the accelerator pedal position APP is charted against a period of time while the actuator system 300 is in the dynamic mode DM. In other words, the dynamic mode selection module 120 has already determined the vehicle is in a dynamic state and provided dynamic mode instructions 142 to the actuator system 300. From the first time T1 to the second time T2, the accelerator pedal is at zero position, which may be associated with the vehicle overrun or deceleration into a maneuver. At the second time T2, the driver initiates accelerator pedal tip-in, whereby the accelerator pedal is partially depressed at the fourth time T4 to request a first torque output from the engine. During the tip-in period from the second time T2 to the fourth time T4, the engine control unit 100 executes the dynamic mode instructions 142 and instructs the actuator system 300 to reconfigure to increase the turbine power TP or boost while the accelerator pedal position is maintained, as represented in the upper chart of FIG. 6.

As shown, after the initial tip-in period, the accelerator pedal position APP remains constant from the fourth time T4 to the fifth time T5, which may correspond to driver traversing a turn. While the accelerator pedal position APP remains constant, the actuator system 300 adjusts to increase the turbine power TP of the turbocharger to satisfy the target boost profile 122. At the fifth time T5, the accelerator pedal position APP transitions from the tip-in position to a fully-depressed position. During the transition, the turbine power continues to increase until the turbine power TP reaches the turbine power target $TP_{targ}$ at the sixth time T6. Once the turbine power TP satisfies the turbine power target $TP_{targ}$, the engine control unit 100 instructs the actuator system 300 to exit the dynamic mode DM and to operate in steady state, as the driver (via depression of the accelerator pedal) has requested sufficient power from the engine to satisfy the target boost profile 122 with the actuator system 300 in normal mode NM.

Figure 7:
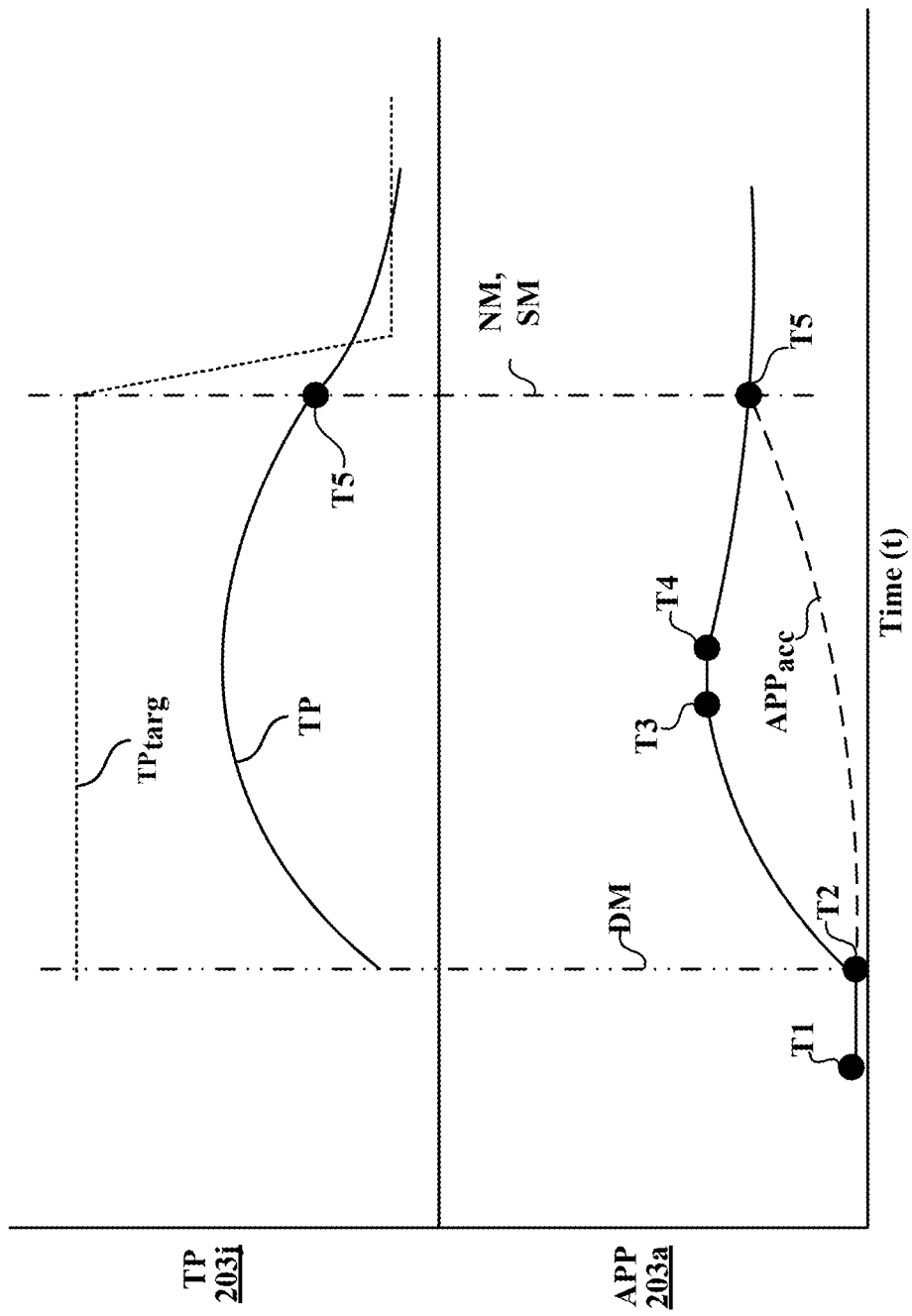
FIG. 7 is a graph showing an example operation of the vehicle control system of FIG. 1, wherein the vehicle control system transitions from dynamic mode to static mode based on an accumulated accelerator pedal position.

Referring now to FIG. 7, another example of the operation of the vehicle control system 10 to transition the actuator system 300 from dynamic mode DM to static mode SM is provided. Particularly, FIG. 7 represents how the actuator system 300 is staged and adjusted according to the dynamic mode instructions 142 to increase turbine power TP (i.e., boost) during an accelerator pedal tip-in period from the second time T2 to the fifth time T5 (T2-T5). Referring to the lower portion of the chart, the accelerator pedal position APP is charted against a period of time t while the actuator system 300 is in the dynamic mode DM. In other words, the dynamic mode selection module 120 has already determined the vehicle is in a dynamic state and provided dynamic mode instructions 142 to the actuator system 300.

In this example, the dynamic mode evaluation module 110 calculates an accumulated accelerator pedal position $APP_{acc}$ value during the tip-in period T2-T5. In some examples, the value of the accumulated accelerator pedal position $APP_{ace}$ corresponds to an integral of the accelerator pedal position APP during the tip-in period T2-T5. In other examples, the accumulated accelerator pedal position $APP_{acc}$ may be calculated as a function of the accelerator pedal position APP and the rate of change of the accelerator pedal position dAPP/dt. The dynamic mode evaluation module 110 is configured to transition the actuator system 300 from dynamic mode DM to either normal mode NM or static mode SM when the value of the accumulated accelerator pedal position $APP_{ace}$ is equal to or greater than the actual accelerator pedal position APP (e.g., at the fifth time T5).

Additionally, the dynamic mode evaluation module 110 may evaluate vehicle acceleration VA, as indicated by the vehicle force inputs 203e. 203f, to determine an accelerator pedal position accumulation rate. For example, when the vehicle acceleration VA is relatively high, the dynamic mode evaluation module 110 will determine that the vehicle is more likely to be in a dynamic state and will reduce accelerator pedal position accumulation rate accordingly. In other words, if the vehicle acceleration VA is relatively high, the accelerator pedal position accumulation will not increase or will increase at a reduced rate. Conversely, if the vehicle acceleration VA is relatively low, the dynamic mode evaluation module 110 will increase the accelerator pedal position accumulation rate.

From the first time T1 to the second time T2, the accelerator pedal is at zero position, which may be associated with the vehicle overrun or deceleration into a maneuver. At the second time T2, the driver initiates accelerator pedal tip-in, whereby the accelerator pedal is partially depressed at a third time T3. During the initial tip-in period from the second time T2 to the third time T3 (T2-T3), the engine control unit 100 executes the dynamic mode instructions 142 and instructs the actuator system 300 to reconfigure to increase the turbine power TP or boost, as represented in the upper chart of FIG. 7. As shown, after the initial tip-in period T2-T3, the accelerator pedal position APP remains constant from the third time T3 to the fourth time T4, which may correspond to driver traversing a turn. While the accelerator pedal position APP remains constant, the actuator system 300 adjusts to increase the turbine power TP of the turbocharger to satisfy the target turbine power $TP_{targ}$ associated with the target boost profile 122.

During the period from the fourth time T4 to the fifth time T5, the accelerator pedal position APP is reduced from the tip-in position at the fourth time T4 to a steady state position at the fifth time T5. At the fifth time T5, the accumulated accelerator pedal position $APP_{acc}$ equals the actual accelerator pedal position APP and the dynamic mode selection module 120 determines that the vehicle is operating in a steady state and transitions from dynamic mode DM. Here, depending on the current calculated vehicle dynamic score $112_{calc}$, the engine control module 100 may instruct the actuator system 300 to transition to normal mode NM (i.e., normal vehicle operation) or the static mode SM. Upon exiting the dynamic mode DM, the dynamic mode selection module 120 generates a boost profile 122 corresponding to steady state driving, which includes a minimized turbine power target $TP_{targ}$, as indicated at the fifth time T5. Thus, when the accumulated accelerator pedal position $APP_{acc}$ is the same as the actual accelerator pedal position APP, the engine control unit 100 requests a reduced turbine power target $TP_{targ}$.

Figure 8:
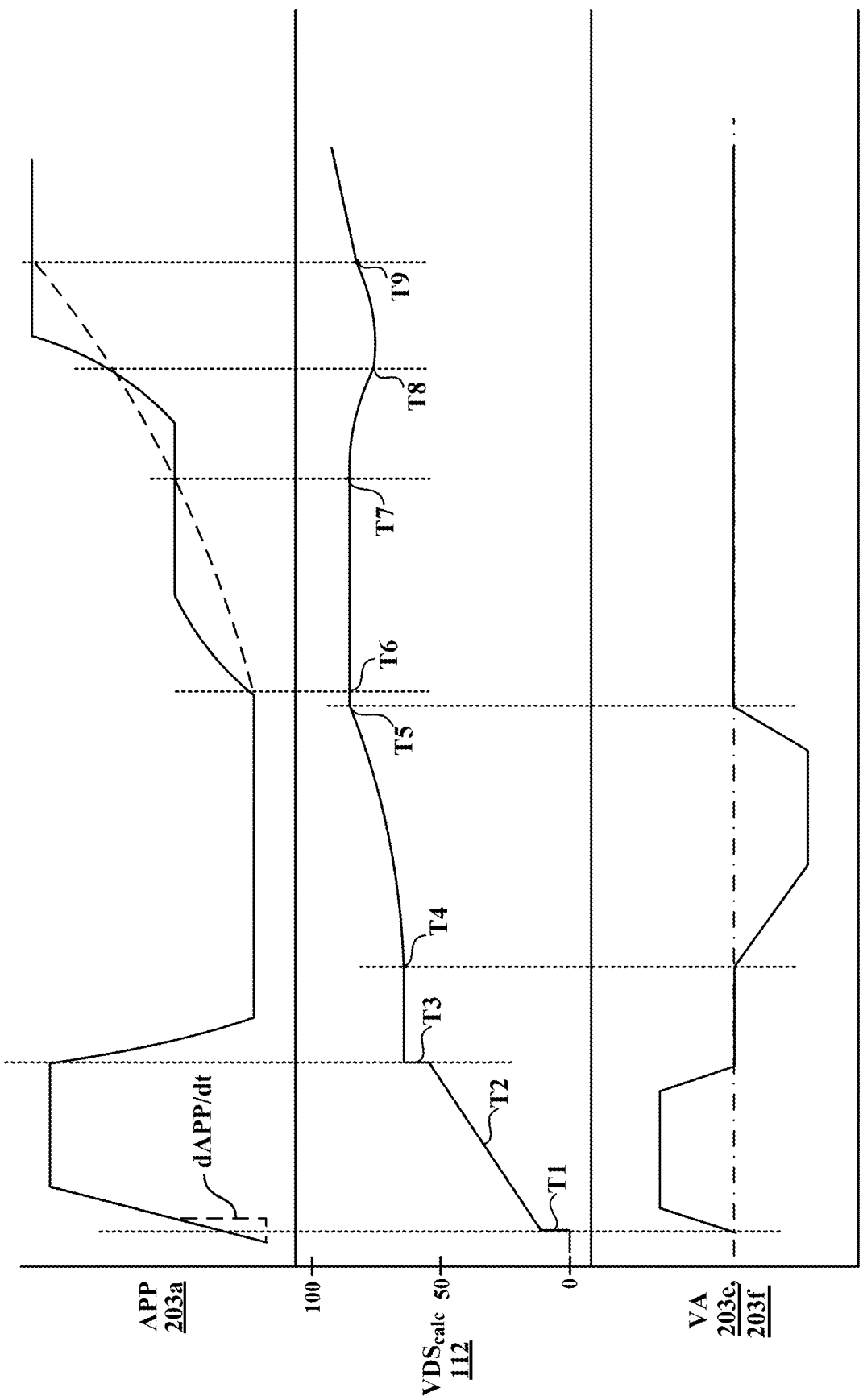
FIG. 8. is a graph showing an example operation of the vehicle control system of FIG. 1, wherein the vehicle control system modulates dynamic mode based on vehicle performance parameter inputs.

Referring to FIG. 8, another example of the operation of the vehicle control system 10) to transition the actuator system 300 between the various staging modes NM, SM, DM is provided. Particularly, FIG. 8 represents how the actuator system 300 is staged and adjusted using a scalar calculated vehicle dynamic score $112_{calc}$. Thus, while the examples provided in FIGS. 2-7 illustrate the dynamic mode selection module 120 determining whether or not the actuator system 300 should transition to dynamic mode DM based on satisfaction of one or more thresholds associated with respective ones of the vehicle performance parameters 203, the operations of the vehicle control system 10 in FIG. 8 are configured to modulate the intensity of the dynamic mode DM according to the calculated vehicle dynamic score $112_{calc}$ based on a comprehensive evaluation of a plurality of the vehicle performance parameter inputs 203. In other words, instead of a binary on/off control of the dynamic mode DM, the dynamic mode is continuously adjusted depending on the vehicle performance parameter inputs. While any number of the vehicle performance parameter inputs 203 may be evaluated in determining the calculated vehicle dynamic score $112_{calc}$, the present example is limited to the vehicle acceleration inputs 203e. 203f and the accelerator pedal position input 203a.

Referring still to FIG. 8, examples of how the calculated vehicle dynamic score $112_{calc}$ is biased based on the vehicle acceleration inputs 202e. 202f and the accelerator pedal position input 203a are provided at various points in time T1-T9. Dashed vertical lines are provided merely as reference to clarify the relationship between either of the inputs 203a. 202e. 202f and the calculated vehicle dynamic score $112_{calc}$. At a first time T1, the accelerator pedal position input 203a indicates a relatively high measured accelerator pedal position change rate $dAPP/dt_{meas}$. Here, the dynamic mode evaluation module 110 instantaneously increases the calculated vehicle dynamic score $112_{calc}$ in connection with the high measured accelerator pedal position change rate $dAPP/dt_{meas}$ and the rapid increase in vehicle acceleration VA, as indicated by the step at the first time T1.

During a second time T2, the dynamic mode evaluation module 110 continues to increase the calculated dynamic mode score $112_{calc}$ in response to the accelerator pedal position APP being maintained at a depressed state, which correspondingly results in a relatively high value of the longitudinal vehicle acceleration VA. Thus, during the second time T2, the calculated vehicle dynamic score $112_{calc}$ is gradually increased. At a third time T3, the accelerator pedal position APP decreases quickly (corresponding to the driver releasing the accelerator pedal) and the vehicle stops accelerating (vehicle acceleration VA is zero). Here, the dynamic mode evaluation module 110 instantaneously increases the calculated vehicle dynamic score $112_{calc}$ in response to the high measured accelerator pedal position change rate $dAPP/dt_{meas}$, which again corresponds to an aggressive or dynamic driving state.

During the period from the third time T3 to a fourth time T4, the dynamic mode evaluation module 110 suspends accumulation (i.e., increase) of the calculated vehicle dynamic score $112_{calc}$ in response to values associated with each of the accelerator pedal position APP and the vehicle acceleration VA being relatively low. During the time period form the fourth time T4 to the fifth time T5, the value of the accelerator pedal position APP is relatively low, such that the associated vehicle longitudinal forces (i.e., speeding up) would be relatively low. However, as shown in the lower portion, the vehicle still experiences increased vehicle acceleration associated with lateral forces, which may correspond to the vehicle traversing a turn. Thus, during the period from the fourth time T4 to the fifth time T5, the dynamic mode evaluation module 110 gradually increases the calculated vehicle dynamic score $112_{calc}$ to reflect that the vehicle is being operated in a dynamic state (i.e., aggressive cornering).

At a sixth time T6, the driver applies initial pressure to the accelerator pedal during an accelerator pedal tip-in phase. After initial tip-in, the value of the accelerator pedal position APP remains at an intermediate state corresponding to the driver maintaining a reduced speed. As discussed previously, the dynamic mode evaluation module 110 calculates an accumulated accelerator pedal position $APP_{acc}$ value during the tip-in period T6-T7 and changes the staging mode NM. SM. DM when the value of the accumulated accelerator pedal position $APP_{acc}$ is the same as the value of the actual accelerator pedal position APP. However, while the previous example of FIG. 7 illustrates the dynamic mode evaluation module 110 exiting dynamic mode DM when the value of the accumulated accelerator pedal position $APP_{acc}$ meets the value of the accelerator pedal position APP, the example of FIG. 8 illustrates the dynamic mode evaluation module 110 sustaining dynamic mode DM and modulating the calculated dynamic vehicle score $112_{calc}$ when the when the value of the accumulated accelerator pedal position $APP_{acc}$ meets the value of the accelerator pedal position APP at the seventh time T7. Thus, during the period from the seventh time T7 to an eighth time T8, the dynamic mode evaluation module 110 reduces the calculated dynamic vehicle score $112_{calc}$.

At the eighth time T8, the dynamic mode evaluation module 110 determines that the measured accelerator pedal position change rate dApp/dt exceeds a threshold change rate $dAPP/dt_{thresh}$ and resumes accumulation of the calculated vehicle dynamic score $112_{calc}$. At a ninth time T9, the dynamic mode evaluation module 110 reduces the calculated vehicle dynamic score $112_{calc}$ accumulation rate to correspond the value of the accelerator pedal position APP being maintained at a constant, but increased position.

As set forth in FIG. 8, the vehicle control system 10 may be configured to continuously modulate the calculated vehicle dynamic score $112_{calc}$ based on the vehicle performance parameters, whereby the calculated vehicle dynamic score $112_{calc}$ is increased in response to more aggressive driving maneuvers associated with a dynamic state and reduced in response to less aggressive driving maneuvers associated with steady state. The dynamic mode selection module 120 continuously generates target boost profiles 122 and selects or generates corresponding dynamic mode instructions 142 in response to the modulation of the calculated vehicle dynamic score $112_{calc}$. Thus the actuator system 300 is continuously modulated to reflect to current calculated vehicle dynamic score $112_{calc}$.

Figure 9:
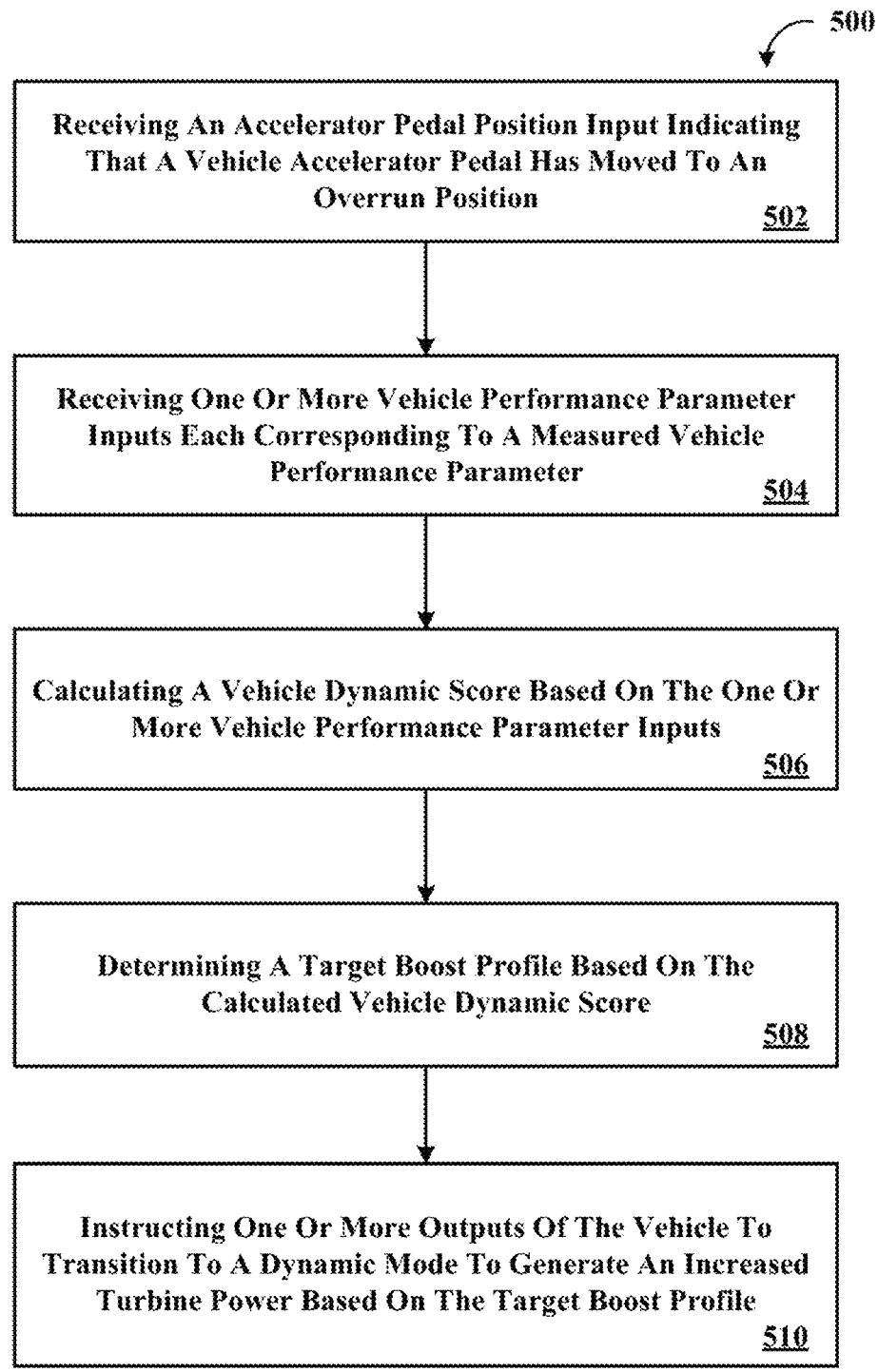
FIG. 9 is a flow chart showing an example order of operations for operating the vehicle control system.

Referring now to FIG. 9, an example method 500 of operating the vehicle control system 10 is provided. In one operation 502, the method 500 includes receiving an accelerator pedal position input indicating that a vehicle accelerator pedal has moved to an overrun position. In another operation 504, the method 500 includes receiving one or more vehicle performance parameter inputs each corresponding to a measured vehicle performance parameter. In another operation 506, the method includes calculating a vehicle dynamic score based on the one or more vehicle performance parameter inputs. In another operation 508, the method includes determining a target boost profile based on the calculated vehicle dynamic score exceeds a threshold vehicle dynamic score. In another operation 510, the method 500 includes when the vehicle is in the dynamic state, instructing one or more outputs of the vehicle to transition to a dynamic mode to generate an increased turbine power based on the target boost profile.

As discussed above, the engine control unit 100 is configured to execute dynamic mode instructions 142 to stage the actuators 302 of the actuator system 300 in the dynamic mode DM. Generally, the actuators 302 are configured in dynamic mode DM to provide increased power at the turbine side of the turbocharger during a period when the turbine power TP requested by the driver via the accelerator pedal position APP is less than the turbine power TP associated with the target boost profile 122. Thus, the engine control unit 100 instructs the actuator system 300 to configure in a manner that increases the turbine power TP independent of the accelerator pedal position APP. Increasing the turbine power TP independent of the accelerator pedal position APP may be accomplished by various combinations of configurations of the actuators 302. For example, the dynamic mode instructions 142 may include requested parameters for retarding the spark, adjusting camshaft phase, and/or increasing engine airflow to generate increased turbine power while satisfying the torque request associated with the actual accelerator pedal position. In other words, turbine power TP is increased without a noticeable change in torque output from the engine. Thus, the increased boost associated with the increased turbine power TP is available to the engine when the driver exits the maneuver and requests increased torque from the engine (i.e., accelerates the vehicle).

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware of a motor vehicle including a turbocharger having a turbine, causes the data processing hardware to perform operations comprising:
   receiving an accelerator pedal position input indicating that a vehicle accelerator pedal has moved to an overrun position;
   receiving a plurality of vehicle performance parameter inputs each corresponding to a measured vehicle performance parameter, the plurality of vehicle performance parameter inputs including accelerator pedal position, accelerator pedal position rate of change, accelerator pedal position accumulation, brake pedal position, braking force, vehicle lateral force, vehicle longitudinal force, driver selected vehicle mode, engine speed, vehicle speed, and transmission gear selection;
   calculating a vehicle dynamic score based on the plurality of vehicle performance parameter inputs;
   determining a target boost profile based on the calculated vehicle dynamic score; and
   instructing one or more outputs of the vehicle to transition to a dynamic mode to generate an increased turbine power based on the target boost profile.

2. The method of claim 1, further comprising:
   determining that the vehicle is in a dynamic state when the calculated vehicle dynamic score exceeds a threshold vehicle dynamic score; and
   when the vehicle is in the dynamic state, instructing the one or more outputs of the vehicle to transition to the dynamic mode to generate the increased turbine power.

3. The method of claim 1, wherein the plurality of vehicle performance parameter inputs includes a vehicle acceleration input.

4. The method of claim 1, wherein determining that the vehicle is in a dynamic state includes determining that the vehicle is the dynamic state while the accelerator pedal is in the overrun position.

5. The method of claim 1, wherein the one or more outputs of the vehicle include an air intake rate, a fuel intake rate, a wastegate actuator output, and a camshaft phaser output.

6. The method of claim 1, wherein the operation of instructing one or more outputs of the vehicle to transition to a dynamic mode occurs while the accelerator pedal is in the overrun position.

7. A system comprising:
   data processing hardware; and
   memory hardware in communication with the data processing hardware, the memory hardware storing instructions that when executed on the data processing hardware cause the data processing hardware to perform operations comprising:
   receiving an accelerator pedal position input indicating that a vehicle accelerator pedal has moved to an overrun position;
   receiving a plurality of vehicle performance parameter inputs each corresponding to a measured vehicle performance parameter, the plurality of vehicle performance parameter inputs including accelerator pedal position, accelerator pedal position rate of change, accelerator pedal position accumulation, brake pedal position, braking force, vehicle lateral force, vehicle longitudinal force, driver selected vehicle mode, engine speed, vehicle speed, and transmission gear selection;
   calculating a vehicle dynamic score based on the plurality of vehicle performance parameter inputs;
   determining a target boost profile based on the calculated vehicle dynamic score exceeds a threshold vehicle dynamic score; and
   instructing one or more outputs of the vehicle to transition to a dynamic mode to generate an increased turbine power based on the target boost profile.

8. The system of claim 7, further comprising:
   determining that the vehicle is in a dynamic state when the calculated vehicle dynamic score exceeds a threshold vehicle dynamic score; and
   when the vehicle is in the dynamic state, instructing the one or more outputs of the vehicle to transition to the dynamic mode to generate the increased turbine power.

9. The system of claim 7, wherein the plurality of vehicle performance parameter inputs includes a vehicle acceleration input.

10. The system of claim 7, wherein determining that the vehicle is in a dynamic state includes determining that the vehicle is the dynamic state while the accelerator pedal is in the overrun position.

11. The system of claim 7, wherein the one or more outputs of the vehicle include an engine air intake rate, a fuel intake rate, a wastegate position output, and a camshaft phase output.

12. The system of claim 7, wherein the operation of instructing one or more outputs of the vehicle to transition to a dynamic mode occurs while the accelerator pedal is in the overrun position.

13. A motor vehicle comprising:
a sensor system including a plurality of sensors;
an actuator system including a plurality of actuators associated with a turbocharger;
data processing hardware sensor system and the actuator system; and
memory hardware in communication with the data processing hardware, the memory hardware storing instructions that when executed on the data processing hardware cause the data processing hardware to perform operations comprising:
- receiving an accelerator pedal position input indicating that a vehicle accelerator pedal has moved to an overrun position;
- receiving a plurality of vehicle performance parameter inputs each corresponding to a measured vehicle performance parameter, the plurality of vehicle performance parameter inputs including accelerator pedal position, accelerator pedal position rate of change, accelerator pedal position accumulation, brake pedal position, braking force, vehicle lateral force, vehicle longitudinal force, driver selected vehicle mode, engine speed, vehicle speed, and transmission gear selection;
- calculating a vehicle dynamic score based on the plurality of vehicle performance parameter inputs;
- determining a target boost profile based on the calculated vehicle dynamic score; and
- instructing one or more outputs of the vehicle to transition to a dynamic mode to generate an increased turbine power based on the target boost profile.

14. The motor vehicle of claim 13, further comprising:
determining that the vehicle is in a dynamic state when the calculated vehicle dynamic score exceeds a threshold vehicle dynamic score; and
when the vehicle is in the dynamic state, instructing the one or more outputs of the vehicle to transition to the dynamic mode to generate the increased turbine power.

15. The motor vehicle of claim 13, wherein determining that the vehicle is in a dynamic state includes determining that the vehicle is the dynamic state while the accelerator pedal is in the overrun position.

* * * * *